Feb. 29, 1944. A. W. LE FEVRE ET AL 2,342,872
AUTOMOBILE HEATER
Filed Sept. 22, 1938 3 Sheets-Sheet 2
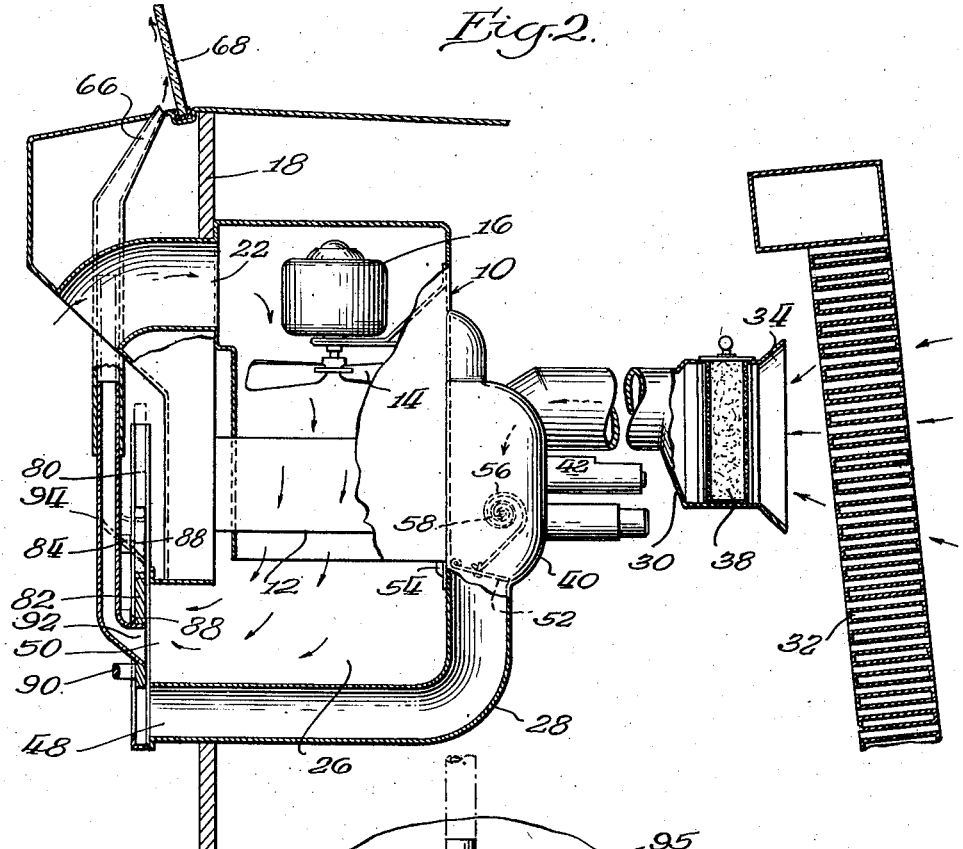
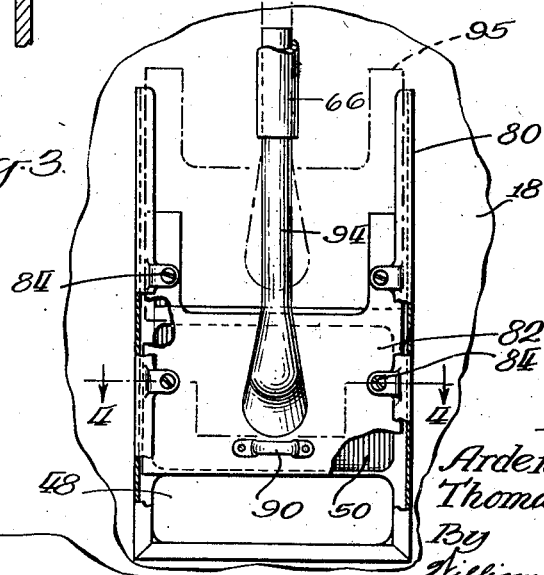
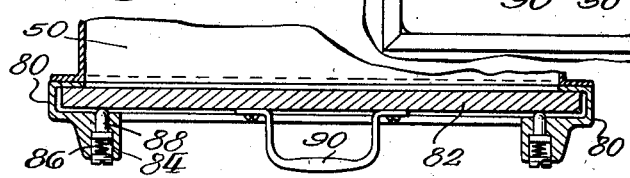
Inventors.
Arden W. Le Fevre
Thomas F. Spackman
By
Williams, Bradbury,
McColl & Hinkle
Attys.

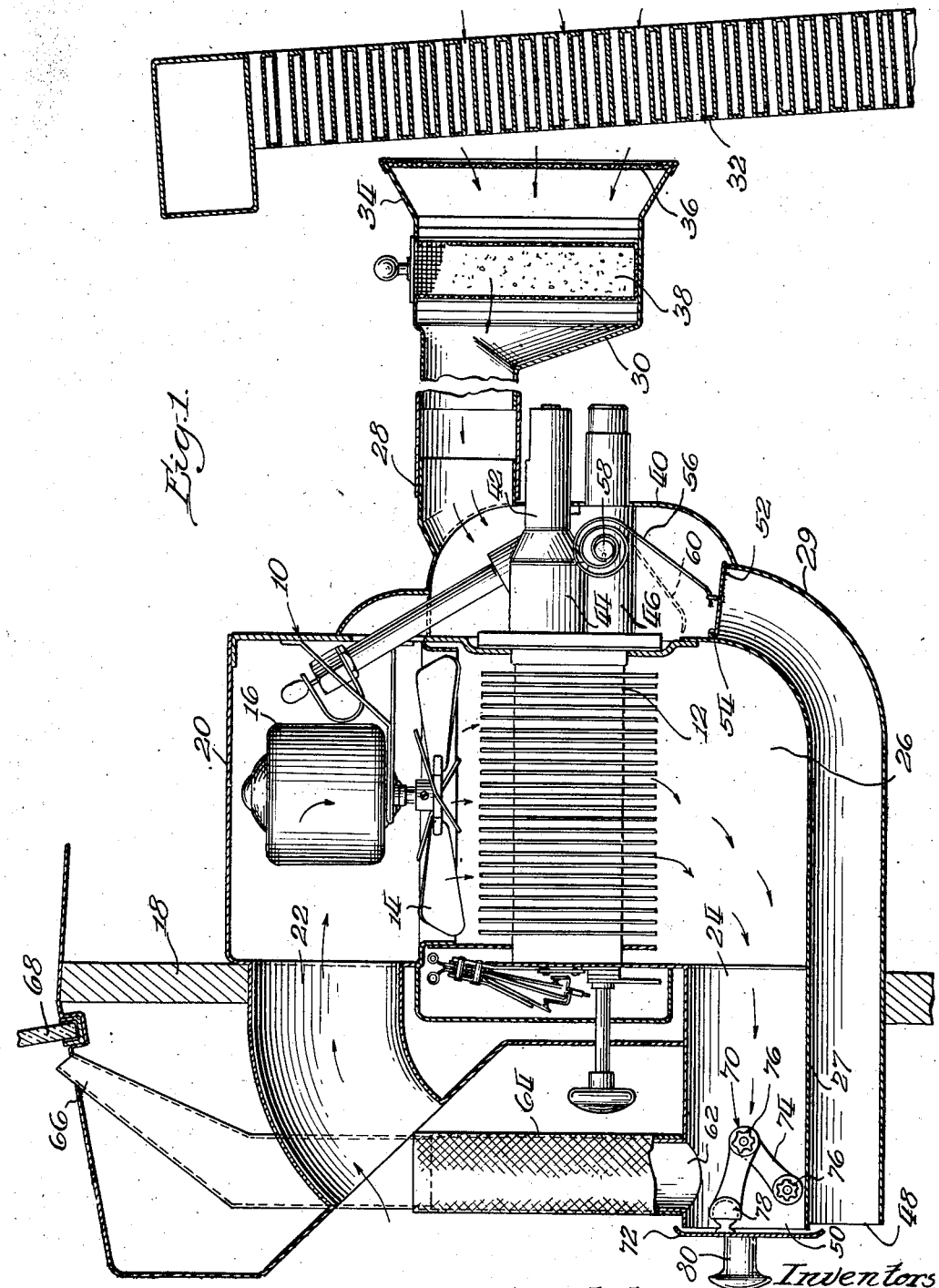

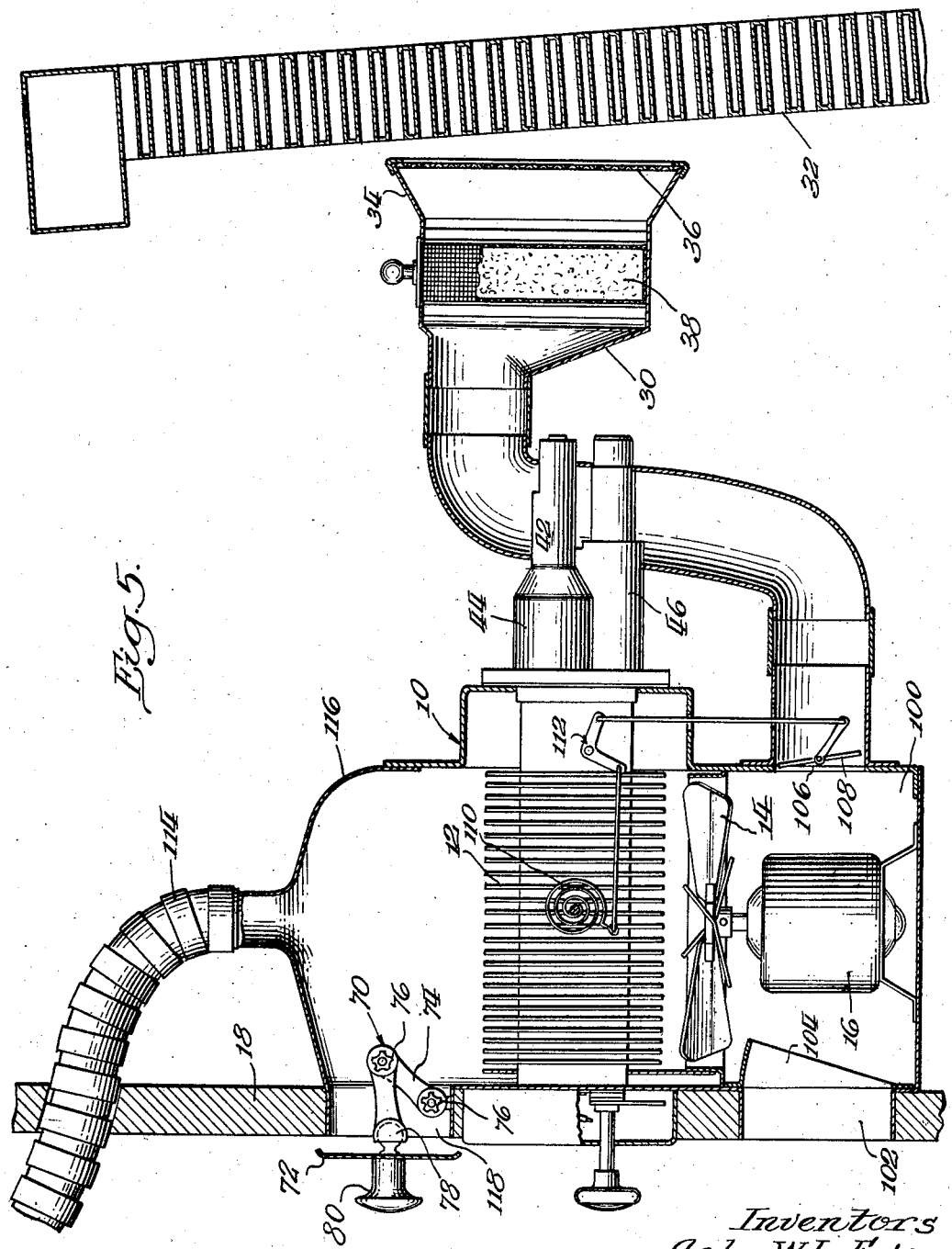

Patented Feb. 29, 1944

2,342,872

UNITED STATES PATENT OFFICE 2,342,872

AUTOMOBILE HEATER

Arden W. Le Fevre and Thomas F. Spackman, Chicago, Ill., assignors to Stewart-Warner Corporation, Chicago, Ill., a corporation of Virginia Application September 22, 1938, Serial No. 231,233

11 Claims. (Cl. 98—2)

The present invention relates to heaters for motor vehicles.

One of the objects of the present invention is to provide an improved device for supplying fresh air to and heating the riding compartment of a motor vehicle under forced circulation.

Another object of the invention is to provide an improved control for regulating and proportioning the amount of air supplied to the windshield and to the riding compartments of automobiles for the comfort and safety of the passengers.

Another object of the invention is to provide a single control regulating the heat and amount of heated air used to defrost a windshield and the heat and amount of heated air supplied to the interior of a passenger compartment of an automobile.

Another object of the invention is to provide improved heater and defrosting equipment for automobiles.

Another object of the invention is to provide a single combined deflector and valve control for a plurality of air outlets of a heater.

Another object of the invention is to provide a heating system with a plurality of outlets opening into the passenger compartment of an automobile, one of which supplies air to defrost a windshield, wherein the flow of air through all of them is under the control of a single deflector.

Another object of the invention is to provide in a device of the class described an air circulation control which is responsive to the combined temperatures of the recirculated air and the fresh air and to the temperature of the heat exchange unit over which the recirculated and fresh air are forced in heat exchange relationship.

Another object of the invention is to provide an air heating system for automobiles wherein two supplies of air are circulated independently of each other over a heat exchange unit wherein one is a filtered supply of fresh air introduced directly to the passenger compartment and the other is a supply of heated recirculated air regulated in various proportions for supplying heat to the passenger compartment and for defrosting windshields.

Another object of the invention is to provide a device of the class described which is simple in construction and operation, effective in its use and inexpensive to manufacture and operate.

These being among the objects of the invention, other and further objects will become apparent from the drawings herein, the description relating thereto, and the appended claims.

Referring now to the drawings:

Figure 1 is a side elevation, partly in section, of a heater and air circulating system illustrating one of the embodiments of the invention.

Figure 2 is a side elevation, partly in section, similar to that illustrated in Figure 1, illustrating another embodiment of the invention.

Figure 3 is a front elevation of the deflector control portion of the embodiment illustrated in Figure 2.

Figure 4 is a section taken upon the line 4—4 of Figure 3; and

Figure 5 is a view similar to Figure 1, illustrating another embodiment of the invention.

Referring now to the drawings in further detail, and particularly to Figure 1, a heater 10, having a radiator 12 and a fan 14 driven by a motor 16, is shown mounted on the dash 18 of a motor vehicle to heat the interior of the passenger compartment under forced air circulation. A shell 20 having an inlet opening 22 near the top thereof and an outlet opening 24 near the bottom houses the radiator, fan, and motor, to provide a heat exchange compartment 26. The air to be heated is drawn from the interior of the passenger compartment through the inlet opening 22 and forced by the fan 14 over the radiator 12 back into the passenger compartment through a short conduit 27 leading from the outlet opening 24. In this way the air inside the compartment is heated, circulated and recirculated to retain for passenger comfort the moisture content of the air inside the compartment which is acquired from occupancy thereof.

Referring to the conduit 27, an outlet opening 62 is provided in the side thereof in addition to the opening 50 at the end. The opening 62 is in communication with a nozzle 66 through a conduit 64 so that air is delivered upwardly over the conventional automobile windshield 68 for defrosting purposes. The location of the opening 62 in the side of the conduit 27 is such that little, if any, air enters the opening 62 when the opening 50 is free of obstructions.

Fresh air is supplied to the passenger compartment through the tube 28 leading from a bell-shaped member 30 located immediately behind the radiator 32 of the conventional engine cooling system, where the mouth 34 of the member 30 faces into the air stream coming through the radiator 32. The air stream mentioned is developed by the engine fan (not shown), or the forward movement of the vehicle, or both working together. The air entering the mouth 34 is first filtered of large debris by a close mesh screen 36, and further filtered of obnoxious odors and condensible gases by a replaceable unit 38 filled with activated carbon.

From the member 30, the air is conducted to a jacket 40 covering the mixing chamber 42, combustion chamber 44 and exhaust conduit 46 of the heater 10 from whence the air is delivered to the interior of the passenger compartment through tube 29 and the opening 48 located immediately below the opening 50. The openings 48 and 50 are preferably located substantially coplanar and proximate each other.

The flow of fresh air through the conduit 28 is controlled by a valve 52 hinged at the outlet of the jacket 40 as at 54 and the valve 52 is in turn controlled by a thermostat 56 mounted proximate the outlet conduit 46 on a pin 58. The movement range of the thermostat 56 is indicated in phantom at 60.

Whenever the temperature of the exhaust conduit 46 and the combustion chamber 44 is sufficient to raise the temperature in the jacket 40 a substantial degree to remove the chill from the air passing through the conduit 28, the thermostat 56 responds and opens the valve 52 so that air may flow into the interior of the compartment exclusively of the recirculated air which is driven by the motor 16 and fan 14.

In order to regulate the amount of air entering the opening 62, a combined deflector and valve indicated generally at 70 is employed at the opening 50 to cover the opening 50 in varying degrees and at different angles. The combined deflector and valve 70 comprises a shield 72 mounted in the conduit 26 by toggle arms 74 which are frictionally forced together by spring washers 76 and mounted in the conduit 26. A pressed universal friction joint 78 supports the shield 72 upon the arms 74 and the shield 72 is movable by the handle 80 to, and will retain, any position imposed upon it by the operator within the movement limits of the toggle and universal joint.

When the shield 72 is pressed fully against the opening 50 the whole force of the fan 14 is brought to bear upon the defrosting nozzle 66 for de-icing and defrosting purposes. Upon other occasions the shield 72 may be adjusted to direct or deflect any amount of air that might be desired in any direction from the opening 62.

Moreover, due to the location and proximity of the openings 50 and 48, the shield 72 may be used as a deflector for the fresh air entering the compartment through the opening 48, in which event the two separate streams of recirculated and fresh air may be deflected separately or partially mixed by various shield positions according to the desires of the occupants of the passenger compartments.

In this way, with the shield located against the opening 50 the quickly heated recirculated air may be appropriated exclusively for defrosting purposes when starting up the car and thereafter the shield may be moved to admit more and more air directly to the passenger compartment and, as the fresh air supply comes into operation the shield may be moved to deflect air coming from either one or both of the openings 48 and 50.

Referring to Figures 2, 3 and 4, a modification of the defroster and deflector is illustrated wherein parallel guides 80 support a sliding closure or deflector 82 for vertical movement in the guides over the openings 48 and 50 to cover selectively either opening, or to clear both openings so that either or both fresh air or recirculated air may be supplied to the passenger compartment. Suitable detents 84 comprising springs 86 pressing pins 88 against the deflector 82 frictionally hold the deflector at any position imposed upon it, and a handle 90 is secured to the front of the deflector 82 to manipulate the deflector.

The deflector 82 has an opening 92 therein registering with either or both of the openings 48 and 50, depending upon the position of the deflector, and the opening 92 leads to a conduit 94 that telescopes with the lower end of the defroster nozzle 66 so that either fresh, warm air, or hot, recirculated air, or both, may be supplied for windshield defrosting purposes.

With this embodiment, the quickly heated air of the recirculating system may be employed first in varying degrees to defrost the windshield by moving the deflector 82 downwardly to cover partially or wholly the opening 50. Then, when the fresh air is warmed and begins to flow through the opening 48, the deflector may be lowered further to a point over the opening 48 to employ the warmed fresh air for defrosting purposes and permit the hot recirculated air to be supplied to the passenger compartment directly.

With the embodiment just described, the use of the warmed fresh air as supplied offers many advantages in keeping the windshield clear.

For one thing, the relative humidity of the cold fresh air is comparatively low after it has been heated, and since precipitation upon a windshield occurs when the air contacting and moving across the windshield is cooled below the dew point before leaving the windshield, the lower dew point afforded by warmed cold outside air makes it possible to circulate the air over the windshield at a minimum speed. In operation, when starting up the recirculated air, which has a relatively high dew point, the air is heated by the radiator and driven at a high velocity over the windshield to de-ice and defrost it. Then, when operating conditions are well under way, the warm low-humidity fresh air is brought into operation to keep the windshield clear at a lower velocity so that the air heated by the radiator 12 may be utilized for passenger comfort. However, in event of unusual conditions wherein the warm fresh air is not enough to maintain clear vision, a portion of the air heated by the radiator may be added by raising the deflector 82 slightly.

For another thing, the speed of the warmed fresh air circulated over the windshield should be greater when the windshield is being cooled at a greater rate and, inasmuch as the rapidity with which a windshield is cooled is roughly proportional to the speed at which the outside air strikes it due to the speed of the vehicle, it will be appreciated that the speed of circulation of the fresh air over the windshield is in proportion to the rate at which the windshield is cooled because the speed of circulation of the warmed fresh air over the windshield is also induced by the air stream created by the forward movement of the vehicle.

In event defrosting is not necessary, the deflector 82 may be raised to its upper limit as illustrated in phantom lines 96 and air from both openings 48 and 50 will be supplied directly to the passenger compartment.

Referring now to Figure 5, another embodiment of the invention is illustrated wherein the fresh air and the recirculating air enter the same compartment to mingle and be forced over the radiator in heat exchange relationship.

The recirculated air enters the fan and motor compartment 100 through the opening 102 which is provided by a shield 104 to carry the recirculated air well within the compartment and the fresh air enters through the opening 106 as controlled by the butterfly valve 108.

The swirl of the fan 14 mingles the fresh and recirculated air, and a thermostat 110 is positioned in the resulting air stream where it is responsive also to the heat radiation of the radiator 12. Suitable linkage 112 connects the valve 108 with the thermostat 110. The thermostat flexes to open the valve with temperature increases. In this way the supply of fresh air is regulated in relation to three factors: first, the residuary temperature of the air to be recirculated as an influencing factor related to the temperature of the air in the compartment; second, the resulting effect derived from adding quantities of fresh air to the recirculated air for use in the compartment; and third, the heat radiation factor of the radiator as a criterion of how much heat is available for the comfort of the passengers.

With certain heater installations as conventionally made, it is desirable to vary the speed of the air by varying the circulating speed of the motor and fan. In such cases, less air is driven over the radiator at the slower speeds, the heat of the radiator increases due to accumulation of heat units, and the temperature of the air driven into the passenger compartment is ultimately increased greatly.

In the present invention, slowing up the motor 16 does not bring about any appreciable change in the temperature of the air supplied to the passenger compartment. When the speed of the motor 16 is reduced, less air will pass over the thermostat to remove the heat it absorbs from the radiator. The heat of the thermostat increases and the opening of the valve 108 will be increased. As the valve 108 is opened further and further, the pressure developed at the mouth 34 will urge more and more fresh air through the opening 106, to supplant, if necessary, the recirculated air supply, the source of air under pressure dominating the source of air inside the passenger compartment which is static. In this gradual adjustment, more and more cool or slightly warmed air is supplied to absorb the surplus of heat available in the radiator due to a reduction in the circulating speed. The heat of the radiator will remain the same under the varying operating conditions because more heat is absorbed by the colder air but the temperature of the air supplied the compartment will remain substantially the same, and a gradual cut over will be made from the recirculating air to fresh air when the motor speed is reduced.

In this connection, the thermostat 110 is located where the speed of air circulation operates to determine the amount of heat which the thermostat retains or is subjected to. For instance, although the thermostat 110 may be so shielded as not to be materially affected by air currents developed at low air circulating speeds, yet bathed with flowing air at high speeds, it is sufficient for all practical purposes to make the thermostat a spirally wrapped bi-metal strip and mount it upon the radiator in a position wherein the plane of the thermostat is disposed edgewise to the stream of air of the fan so that the outer coil of the thermostat shelters the inside coils except when the higher air circulated at higher speeds becomes turbulent. Thus the thermostat controls the valve 108 in relationship to the speed of air circulation and the heat content of the radiator and the temperature and volume of air supplied by the heater are controlled by a thermostat responsive to the variable factors entering into said temperature and volume whereby such are maintained substantially constant.

In the embodiment just described, a flexible tube 114 is provided at the top of the shell 116 housing the radiator 12 to convey heated air to the windshield for purposes already mentioned, and the opening 118 leading to the passenger compartment is provided with a shield 72, the structure of which has already been described, to vary and regulate the flow of heated air.

In this way, improved devices for supplying air to the riding compartment and windshield for defrosting purposes are provided, capable of regulating, apportioning and otherwise controlling the amounts and temperature of fresh and recirculated air, and, although several embodiments of the invention have been shown and described, it will be readily apparent to those skilled in the art that various further uses, modifications and changes may be made without departing from the spirit of the invention, the scope of which is commensurate with the appended claims.

What is claimed is:

1. In a heater for automobile compartments comprising an outlet conduit, an air current deflector comprising a pair of toggle arms secured together by bolts and forced into frictional supporting relation with each other by spring washers secured on said bolts, means frictionally supporting one of the free ends of said toggles in said conduit, and a shield supported in frictional universal relationship to the other free end of said toggle for movement and support relative to said conduit in a plurality of positions varying in distance from the opening of said conduit, and varying in angle to said opening.

2. In an automobile compartment heater having a dual outlet to supply separate columns of air to said compartment, two separate conduits opening through a wall of said compartment at points proximate to each other, a combined deflector and valve comprising toggle arms secured together by a bolt and forced into frictional supporting relation relative to each other by spring washers secured on said bolt, means frictionally supporting one of the free ends of said toggle in one of said conduits, and a shield supported universally in frictional relationship with the other free end of said toggle for movement to and support in any one of a number of positions in front of either and both of said conduits.

3. In a heater of the class described for a compartment having a heat exchange unit and means for circulating air over said unit at varying speeds, the combination of a recirculated air supply from said compartment for said circulating means, a fresh air supply for said circulating means, regulating means for controlling the supply of fresh air to said circulating means, and temperature responsive means in proximity to said unit for increasing said fresh air supply when said air circulating means is operating at a low speed.

4. In a heater for an automobile compartment and for defrosting a windshield, the combination including a heat exchange unit, means for forcing air over a portion of said unit, a conduit conducting said forced air from said unit to said compartment, means for conveying fresh air over another portion of said unit, a conduit conducting said fresh air from said unit to said compartment, a third conduit connected to one of said conduits for conveying air to the windshield for defrosting same, and a deflector mounted in proximity to the two first mentioned conduits for controlling the flow through said connected conduit, and for controlling and directing the flow from said first two conduits in the compartment.

5. In a heater for an automobile compartment and for defrosting a windshield, the combination including a heat exchange unit, means for forcing air over a portion of said unit to heat the air, a conduit conducting said forced air from said unit to said compartment, means for conveying fresh air over another portion of said unit to heat the air in a lesser degree, a conduit conducting said fresh air from said unit to said compartment, a movable deflector controlling the flow through said conduits, and a third conduit connected to said deflector to register with said conduits for conveying air to the windshield for defrosting same.

6. In a heater for an automobile compartment, the combination of a heat exchange unit, means for circulating air from inside said compartment over a portion of said unit to heat the air to one degree, a conduit for conducting said air to the compartment, a conduit for conducting said air to the windshield, a conduit for conducting fresh air over another portion of said unit to heat the air in a lesser degree, and deflector means associated with said first and third conduits operable selectively to close either of them and to direct air flowing from either or both to the windshield of said automobile.

7. In a heater and windshield defroster for automobile compartments, the combination including a heat exchange unit, means for recirculating air from the compartment over a portion of said unit to heat the air, means for conducting fresh air over another portion of said unit into said compartment to heat the air in a lesser degree, and selectively operable means for conducting either the heated fresh or recirculated air to the windshield.

8. In a heater and windshield defroster for automobile compartments, the combination including, a heat exchange unit, means for recirculating air from the compartment over a portion of said unit to heat the air, means for conducting said air to a point adjacent a windshield for defrosting the same, means for conducting fresh air over another portion of said unit to heat the air, a conduit for conducting heated fresh air from said other portion into said compartment, and temperature responsive means in proximity to said other portion of said unit for preventing flow of fresh air into said compartment until the temperature reaches a predetermined value.

9. In a heater and windshield defroster for automobile compartments, the combination including, a heat exchange unit, means for recirculating air from the compartment over a portion of said unit to heat the air, means for conducting said air to a point adjacent a windshield for defrosting same, means for conducting fresh air over another portion of said unit to heat the air, a conduit for conducting heated fresh air from said other portion into said compartment, and temperature responsive means for controlling the flow of fresh air to the compartment, said means being so constructed and arranged that the amount of fresh air supplied increases with an increase in temperature.

10. In a heater for an automobile compartment, the combination of a heat exchange unit, means for circulating fresh air over said unit, means for circulating air drawn from the passenger compartment of said automobile over said unit, means for conveying heated air to an outlet opening located adjacent the windshield of said automobile and to an outlet opening in the passenger compartment of said automobile, means including temperature responsive means located in proximity to said unit for preventing the flow of fresh air until the temperature reaches a predetermined degree, and deflector means for controlling the flow of air to the passenger compartment and to proportion the air flowing from both of said outlet openings, said deflector means and outlet openings being so arranged and constructed that substantially all the circulated air may be directed either to the windshield or compartment.

11. In a heater of the class described, having a heat exchange unit and means for recirculating air over said unit at varying speeds, the combination of means for admitting a supply of fresh air into the path of said recirculating air, and temperature responsive means for controlling the supply of fresh air admitted into said heater, said temperature responsive means being mounted within said heater adjacent said heat exchange unit and controlled by the temperature of the air circulating within said heater and the heat conveyed to said temperature responsive means from said heat exchanger, said temperature responsive means being completely surrounded with rapidly moving air when the air circulating speed in said heater is high and only partially by slow moving air when the air circulating speed in said heater is low, whereby the amount of fresh air entering said heater is increased or decreased in proportion to the air circulating speed.

ARDEN W. LE FEVRE.
THOMAS F. SPACKMAN.